United States Patent [19]
Clay

[11] Patent Number: 5,289,786
[45] Date of Patent: Mar. 1, 1994

[54] TRI-GENERATION GARBAGE INCINERATOR

[76] Inventor: Haile S. Clay, P.O. Box 326, LaHonda, Calif. 94020

[21] Appl. No.: 9,176

[22] Filed: Jan. 26, 1993

Related U.S. Application Data

[63] Continuation-in-part of Ser. No. 829,421, Feb. 3, 1992, Pat. No. 5,191,846.

[51] Int. Cl.$^5$ .............................................. F23B 7/00
[52] U.S. Cl. .................................. 110/233; 110/234; 110/346; 122/2
[58] Field of Search .................. 110/233, 234, 346; 122/1 R, 2

[56] References Cited
U.S. PATENT DOCUMENTS 5,134,944  8/1992  Keller et al. .................. 110/234
5,199,356  4/1993  Hoffert ............................ 110/233 X Primary Examiner—Edward G. Favors
Attorney, Agent, or Firm—Ware & Freidenrich

[57] ABSTRACT

The present invention includes four chambers for containing refuse, a porous membrane at least partially enclosing the chambers, and a housing enclosing the porous membrane and the chambers. Combustion fuel is supplied to the porous membrane so that surface combustion takes place at the surface of the porous membrane facing the chamber for burning the refuse contained in the chamber. Electrical means may also be employed to provide combustion of the refuse. Safety features include pressure feed-back means for monitoring and regulating the pressure within the apparatus and temperature feed-back means for monitoring and regulating the temperature within the apparatus. A particle bin is positioned below the chamber for receiving burned particles from the chamber. The gases generated from the burning refuse is collected and pumped through a super heating and purifying chamber (eliminated all hazardous affluent) and into the boiler type heat exchanger and thereby producing steam for electrical generation. The electricity produced is then partially used to run a cryogenic plant which produces liquid oxygen which is used to produce oxygen gas, the major fuel component, used to produce the surface combustion used in the incinerator. Therefore a tri-generation system is generated which reduces operating cost, increase operating efficiency of the incinerator and the bi-produce sold to others generate an off-setting income.

11 Claims, 5 Drawing Sheets

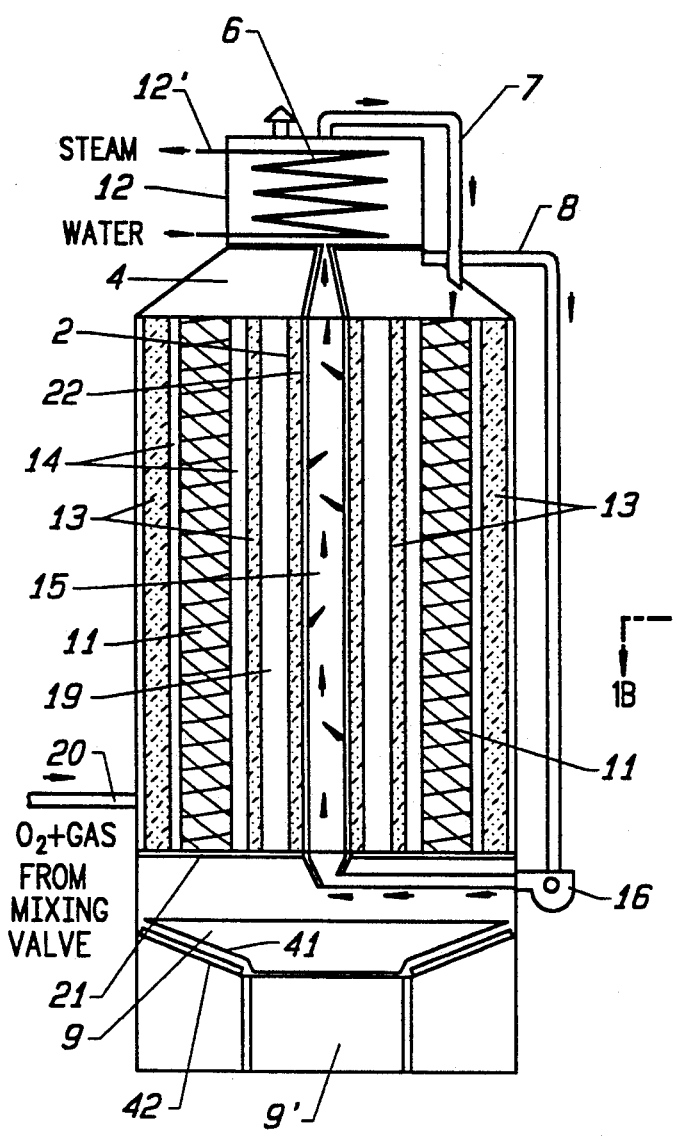
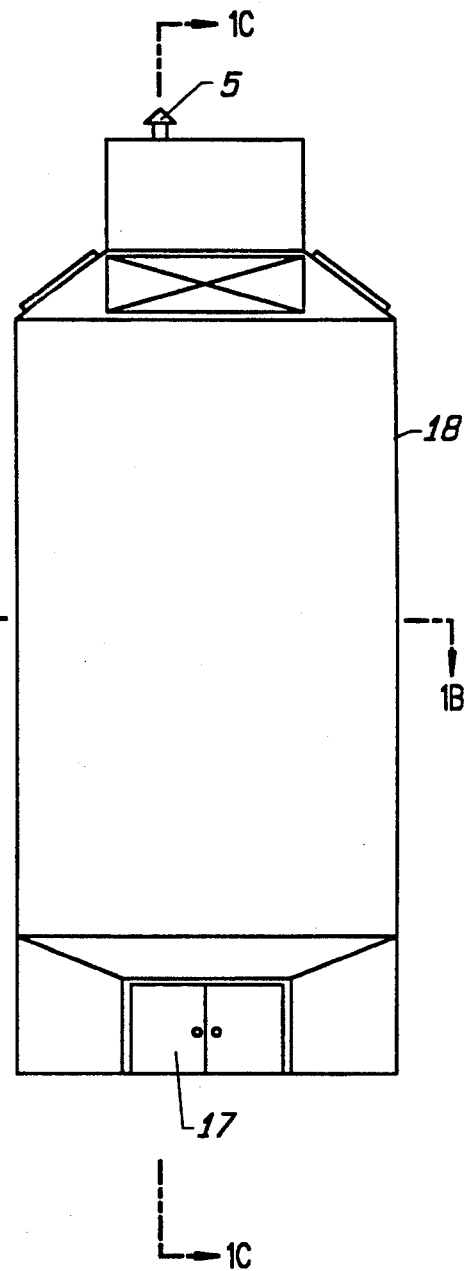
FIG. 1C
FIG. 1D

TRI-GENERATION GARBAGE INCINERATOR

CROSS-REFERENCE TO RELATED APPLICATIONS

This patent application is a continuation-in-part of patent application Ser. No. 07/829,421, filed Feb. 3, 1992 Pat. No. 5,191,846.

FIELD OF THE INVENTION

The present invention relates to an incinerator apparatus. More specifically, it relates to a self-contained incinerator and method for burning refuse in an industrial, municipal or household environment, the production of electricity, and the production of liquified gases.

BACKGROUND OF THE INVENTION

For many years, residents and municipalities burned their own refuse in incinerators which did not have air pollution reducing devices incorporated therein. Most local and state governments have outlawed residential burning activities due to the air pollution problems created by the burning. Instead of burning, residents now send their waste to landfills. However, currently, landfills are being filled to capacity and new landfill sites are becoming less available.

In an effort to solve the landfill problems, communities are turning to recycling and municipal incineration to dispose of refuse. However, these solutions are still in the formative stages and therefore do not provide immediate relief from the ongoing problems of waste management. The current solutions do not solve the air pollution problems associated with burning garbage, and operate at considerable low efficiency. Current incinerators require the constant input of outside air to sustain the burning process. Air is approximately 76% nitrogen which does not burn. The nitrogen, however, must be heated and constantly discharged into the atmosphere. The discharged nitrogen absorbs as much as 70% of heat generated by the burning refuse, and it picks up and carries fly ash which must be removed before the discharge into the atmosphere.

Until the pollution and efficiency problems associated with municipal, industrial and household incineration are solved, other methods are needed to relieve the landfill problems. Accordingly, there is a need for a new type of incinerator and an incineration system. Furthermore, there is a need for an incineration system which operates in a closed cycle environment, is fuel efficient, and is safe for municipal use and other uses.

OBJECTS AND SUMMARY OF THE INVENTION

It is therefore a general object of the present invention to provide an improved and safe municipal, industrial and household incinerator apparatus.

It is another object of the present invention to provide a refuse burning apparatus and method which burns refuse without releasing air polluting contaminants into the ambient environment.

It is a still another object to provide an incinerator with a short, closed cycle process.

It is a yet a further object of the present invention to provide an incinerator which is self cleaning.

It is yet another object to provide an incinerator which is compact, and has no emission stack.

In accordance with these and other objects, the present invention includes a chamber for containing refuse, a porous membrane at least partially enclosing the chamber, and a silo-type housing enclosing the porous membrane and the chamber. Combustion fuel is supplies to the porous membrane so that surface combustion takes place at the surface of the porous membrane facing the chamber for burning the refuse contained in the chamber. Safety features include pressure feed-back means for monitoring and regulating the pressure within the apparatus and temperature feed-back means for monitoring and regulating the temperature within the apparatus. A particle bin is positioned below the chamber for receiving burned particles from the chamber.

The present invention also recycles this waste heat through an after-burner which purifies the gases of hazardous particles, and adds additional heat before it is introduced to the heat recovery process. Steam is generated using the heat and electricity produced therefrom. The electricity is then used to power a cryogenic plant which produces liquified oxygen and nitrogen. The oxygen in turn is used to fuel the incinerator. It is expected that the waste heat recovery increases by 300 to 400%, thus greatly enhancing the generation of electrical power as a by-product.

The incinerator of the present invention does not use outside air to sustain the burning process. Hence, the heat that was previously lost in incinerators of the prior art is now contained within the incinerator and is absorbed by the gases generated from the burning refuse. Therefore, the affluent gases carry a higher heat value, which give rise to a greater recovery of waste heat in the form of steam or power.

BRIEF DESCRIPTION OF THE DRAWINGS

Other objects, and many of the intended advantages of the present invention, will be readily appreciated as the same becomes better understood by reference to the following detailed description when considered in connection with the accompanying drawings wherein:

FIG. 1C is a side cross-sectional view taken along view A—A of FIG. 1D;

FIG. 1D is an exterior view of the combustion apparatus of the present invention;

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents which may be included within the spirit and scope of the invention as defined by the claims.

Figure 1A:
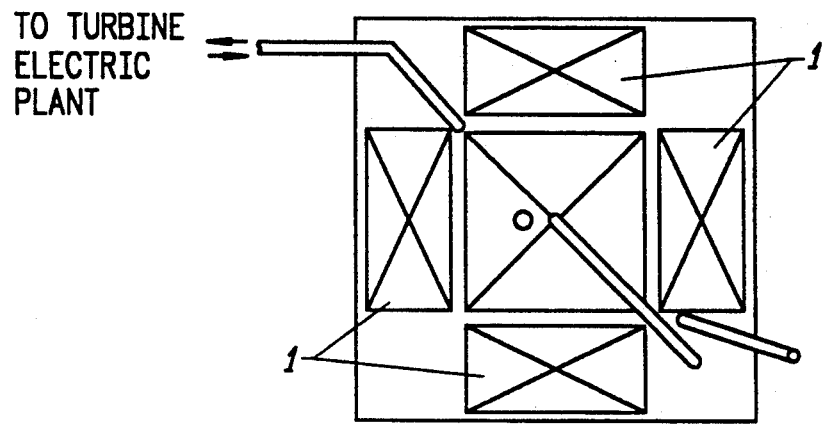
FIG. 1A is a cross-sectional top view of the present invention.
Figure 1B:
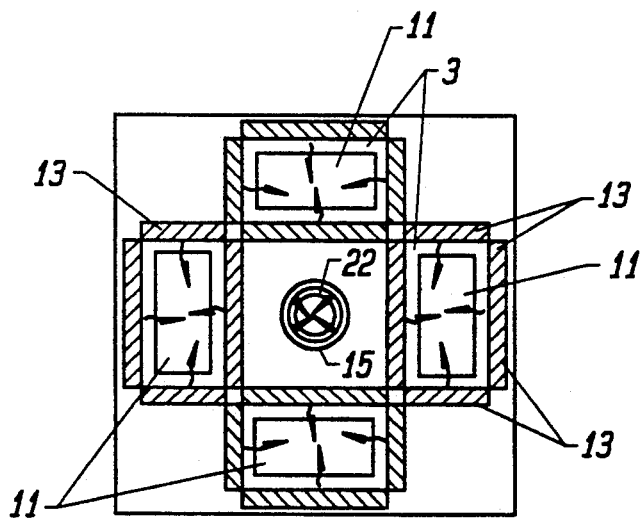
FIG. 1B is a cross-sectional top view taken along cross-section B—B of FIG. 1D.

Attention is drawn to FIGS. 1A-1D, 2 and 4 which show views of the present invention which operates utilizing the process known as surface combustion. FIGS. 1A-1C show four surface combustion incinerators as part of a large incinerator without some of the detail shown in FIG. 4 which shows just one chamber. The present invention can be utilized with one or more incinerator chambers, depending on the specific design details incorporated therein. Moreover, a household incinerator apparatus can include just the surface-combustion incinerator portion of this invention. For example, a configuration like that shown in FIG. 4 can be used as a household single-generation apparatus.

As shown in FIG. 1A, one embodiment includes four chambers 11 for holding refuse and a porous membrane 13 which is separated by a coaxial air space 14 from the chamber 11. The chambers are supported by supports (not shown) so that around the chamber 11, a uniform coaxial air space 14 is maintained. The porous membrane 13 acts as a combustion wall and a radiating surface facing inwardly to the chamber 11. The membrane is constructed from porous refractory material such as graphite, which is also a neutral refractory material. The porous membrane 13 discharges the fuel supplied from the fuel supply 20, so that combustion occurs at the inner surface of porous membrane 13, burning the refuse contained in the chambers 11.

In the first embodiment, combustion gases are used to produce a radiant heat source. If, however, the radiant heat source was produced by electrical means, such alteration would fall within the scope of the present invention. Electrical means such as glowing tubes may replace membrane 13.

Figure 2:
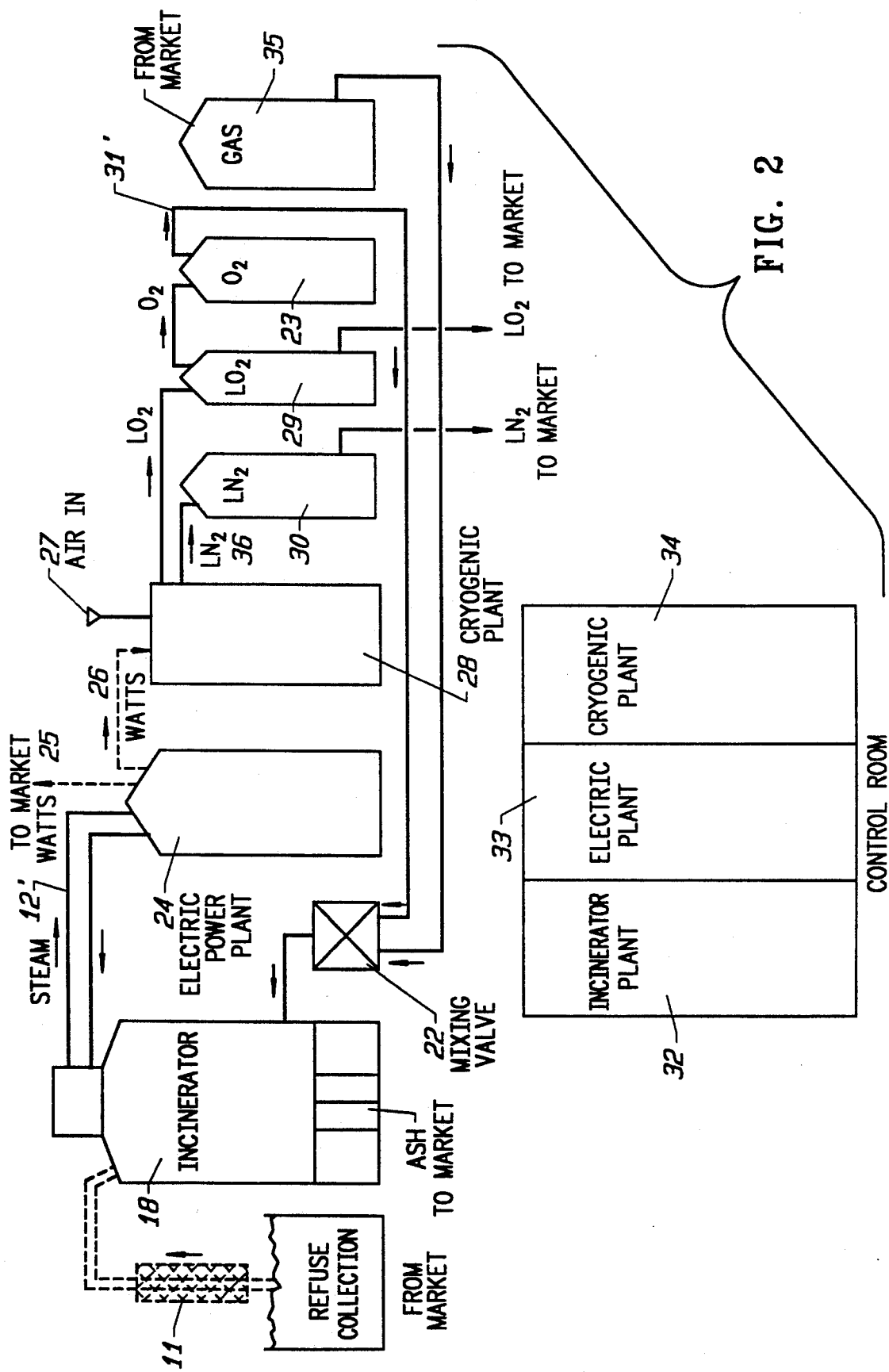
FIG. 2 is a schematic diagram of the tri-generation system of the present invention.
Figure 5:
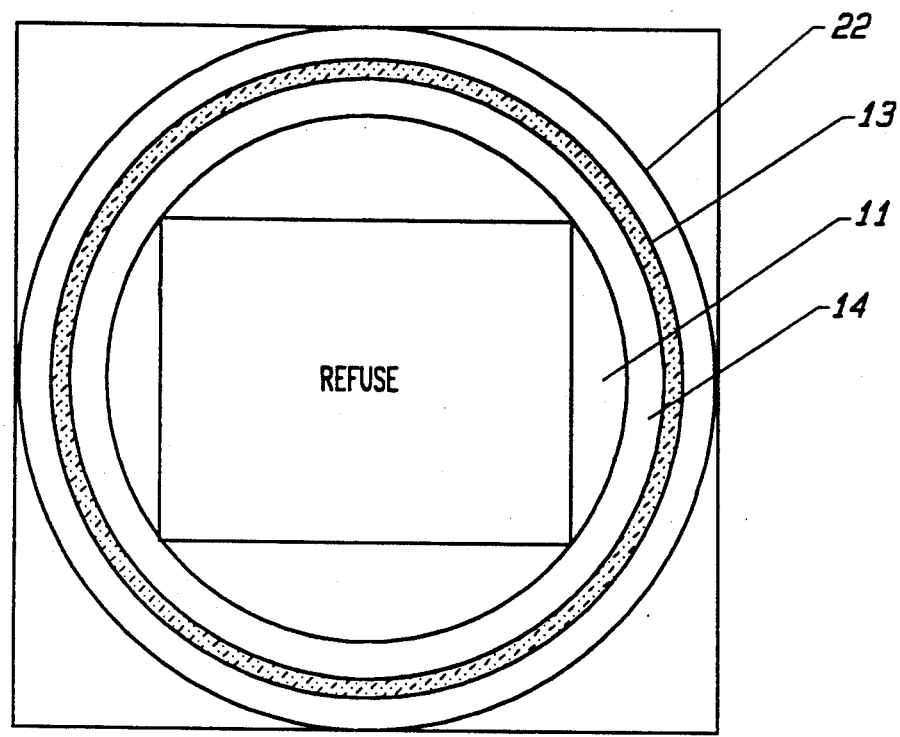
FIG. 5 shows a top view of a single chamber of the present invention.

Fuel supply 20 is a mixture of industrial oxygen, stored in container 23, and methane, stored in container 35, which is combined at mixing valve 22 (see FIG. 2). Such fuels are obtainable in pressurized containers for easy installation on the apparatus of the present invention. Other equally combustible combinations of fuel, such as propane, acetylene, butane or hydrogen, can be combined to effect the surface combustion at the porous membrane described herein.

Surface combustion is an explosive mixture of gas and air in the proper proportions for complete combustion and which is caused to burn without flame in contact with a granular incandescent surface, in this case, porous membrane 13. A large portion of the potential energy of the fuel is immediately converted into radiant heat form so that accelerated combustion is concentrated at surface 13. As the surface combustion becomes incandescent, it will produce intense radiation heat that will cause the refuse which is in close proximity to spontaneously combust. Moreover, a reflecting surface may be included on the surface 10 of the porous membrane 13 facing chamber 11.

Surface combustion provides the attainment of very high temperatures and rapid heating. The proportions of methane and oxygen (purified air which is approximately 99% oxygen) as a fuel used to effect surface combustion per one hundred pounds of compacted refuse are oxygen by volume 67% and methane by volume 22%, a ratio of approximately 2 to 1. Were non-purified air to be used in place of purified air, the ratio of air to burn gas would be approximately 10 to 1. The effective temperature of the refuse is maintained between 1500° to 1700° Fahrenheit.

The surface combustion is supported by the oxygen admitted with the burn gases of fuel supply 20 and is not influenced by the oxygen and other gases that surround the refuse. Because the refuse is burned primarily from radiation heat generated at the porous membrane 13, no combustion air is required to sustain the burning of the refuse. Accordingly, there is no need to supply additional oxygen in the form of air received from the ambient environment to fuel the combustion. The fuel supplied to the porous membrane 13 by fuel supply 20 is sufficient to effect the desired surface combustion. An electronic ignition source or laser may be used to start the combustion.

Chamber 11 houses refuse which is slated for incineration. As the surface combustion generates radiant heat that is transferred from the porous membrane 13 across space 14, intense heat is concentrated at the chamber 11. Since the surface combustion becomes incandescent instantaneously, the complete burn cycle of the incinerator is finished within a short time. The incineration of all of the refuse within the silo 1 is fast and complete. Due to the intense heat and speed of the incineration, gases produced from the refuse during the incineration process are completely burned, therefore, there are no air contaminants left in the system to release to the ambient environment, thus providing a pollution free incineration apparatus. Accordingly, there is no requirement for a flue or emission stack to exhaust unburned nitrogen and related flue type discharges.

FIG. 2 shows the incinerator portion of the present invention in combination with the electricity generator portion and cryogenic plant portion. Steam from the incinerator is used to produce electricity which is, in turn, used to run the cryogenic plant. As shown in FIG. 2, a portion of the electricity produced at conventional electricity-generating plant 24 is used to run a conventional cryogenic plant 28 which produces from ambient air received at intake 27 liquid nitrogen transferred by pipe 31 and stored in container 30, and liquid oxygen transferred in pipe 31 and stored in container 29. The liquid nitrogen produced is sold to others. The boil-off from liquid oxygen stored in container 29 is stored as $O_2$ gas in container 23. The oxygen gas is then mixed with burn gas stored in container 35 at mixing valve 22. The electricity-generating plant 24 (discussed below) which receives steam generated from refuse burning in incinerator 18, is the second leg of the tri-generation system as shown in FIG. 2. The cryogenic plant 28 represents the third leg of the tri-generation system of the present invention. By its inclusion, the fuel cost for the combustion surface burn is lowered.

Returning to FIG. 1C, in order to supply energy to the electricity generator plant 24, the waste heat, i.e., steam and gases generated by the burning refuse is collected at chamber 4 and pumped by pump 16, through super heat chamber 15 where it is super heated, purified, forced through the steam generator 6, and returned to chamber 4. Steam generator 6 is a boiler-type heat exchanger and thereby produces steam for electrical generation.

The steam and gas cycle in the embodiment shown in FIG. 1C, more specifically, provides that the steam and gases stored in chamber 4 is transferred through pipe 8 and pumped by pump 16, through chamber 15 back through steam generator 6 and returned to chamber 4 through pipe 7. Chamber 15 is heated by combustion surface burn at surface 22 contained in container 2. The combustion at combustion surface 22 can be supported by the same gas as is combustion at surface 10, or can be supported by, for example, electrical means. Combustion surface 22 is housed co-axial to container 2 and is separated from porous membrane 13 by space 19. The steam generated is stored in chamber 12, and then the steam is transferred through pipe 12 and is used to produce the electricity at electricity-generating plant 24. Electricity passes through power transfer means 26 and is used to operate the cryogenic plant 24. The surplus power sold to market through electricity-transfer means 25. This inclusion of the power plant 24 also reduces the cost of operating the incinerator.

The controls for the three legs of the tri-generation incinerator are shown in FIG. 2. They include incinerator controls 32, electric power plant controls 33, and cryogenic plant controls 34.

The incinerator position of the present invention is shown as two different embodiments in FIGS. 1A–1D and FIG. 4. Other suitable configurations are within the scope of this invention. Generally, the components of the incinerator portion should be suitable for use at very high temperatures. Chamber 11 consists of a wire cylinder, rectangle or other suitable configuration which is enclosed at the bottom 21 and top 21'. The wire is preferably of the type which has a minimum chemical interaction with refuse and the burn gases. Furthermore, the wire must be strong enough to sustain impacts from exploding items of the refuse such as used spray cans. A suitable type of wire is, for example, titanium, or stainless steel. Alternatively, chamber 11 could be made from high temperature and high strength glass.

The chamber 11 surrounded by porous membrane 13 is positioned within an air-tight housing 18 which is sealed during the combustion and cool down periods to prevent any escape of gasses and burning particulates. A strong material which is able to withstand the temperatures and pressures generated from within the apparatus and which is inert to the refuse and gases produced from the incineration is preferable. Housing 18 is therefore preferably constructed from, for example, stainless steel. The housing 18 is also insulated by insulation 18' to prevent heat from escaping into the ambient environment.

The housing 18 surrounds the back-pressure chamber 18" (see FIG. 4) which forces the mixture of fuels through the porous membrane 12 to sustain the surface combustion. Back-pressure chamber 18" is coaxial to porous membrane 13 to achieve uniformity of the surface combustion. Upon closure of silo lids 1 and clean-out plug 17, the housing 18 becomes a pressure tank and therefore silo lid 1 and clean-out plug 17 are also constructed to adequately endure the temperatures and pressures from within the apparatus.

Feed-back systems monitor and regulate the operating parameters of the apparatus. Pressure feed-back means and temperature feed-back means are provided by a conventional monitoring and feed-back system 32. The pressure feed-back system monitors pressure through monitor 32' and the temperature feed-back system monitors the temperature through monitor 32". The pressure is controlled by varying temperature and by releasing pressure through pressure release value 5. Release valve 5 is shielded by a filter 5' that removes contaminants from the passing gas. Charcoal would be a typical filtering material for this purpose.

The temperature is controlled by adjusting the fuel supply 20. The feed-back system 32 is equipped with an automatic shut-down mechanism in the event that the pressure or temperature exceed safety limitation threshold values. Furthermore, the feed-back system also monitors the seal of the lid 1 operated by a hinge 1' and at the plug 17.

The refuse which is placed in chamber 11 is preferably compacted by a trash compactor. Each chamber 11 may hold up to tons of refuse. The refuse may be introduced into the chamber 11 in a bag so that debris is not forced through the wire mesh prior to combustion. Were the present invention to be used by a household incinerator, it could hold 100 pounds of refuse and therefore approximately four times the volume of the average household trash compactor. When used as a household incinerator, the present invention is compact, having dimensions nearly equivalent to those of a household trash compactor. Since refuse varies in composition, a humidity monitor 34 and regulator is also provided to sustain a humidity level of between 0–1% in the radiant heat transfer zone to assure a complete burn of the enclosed refuse.

Figure 3:
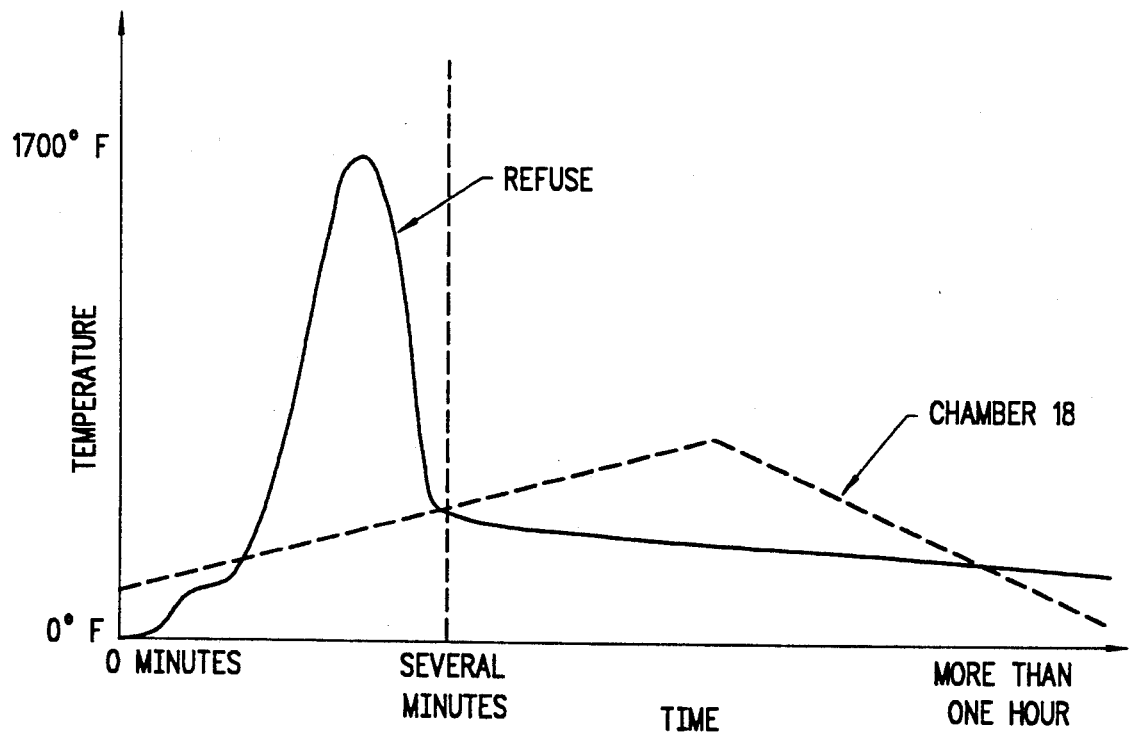
FIG. 3 is a graph of the temperature verse time showing the burn cycle of the refuse and the temperature cycle of the chamber.
Figure 4:
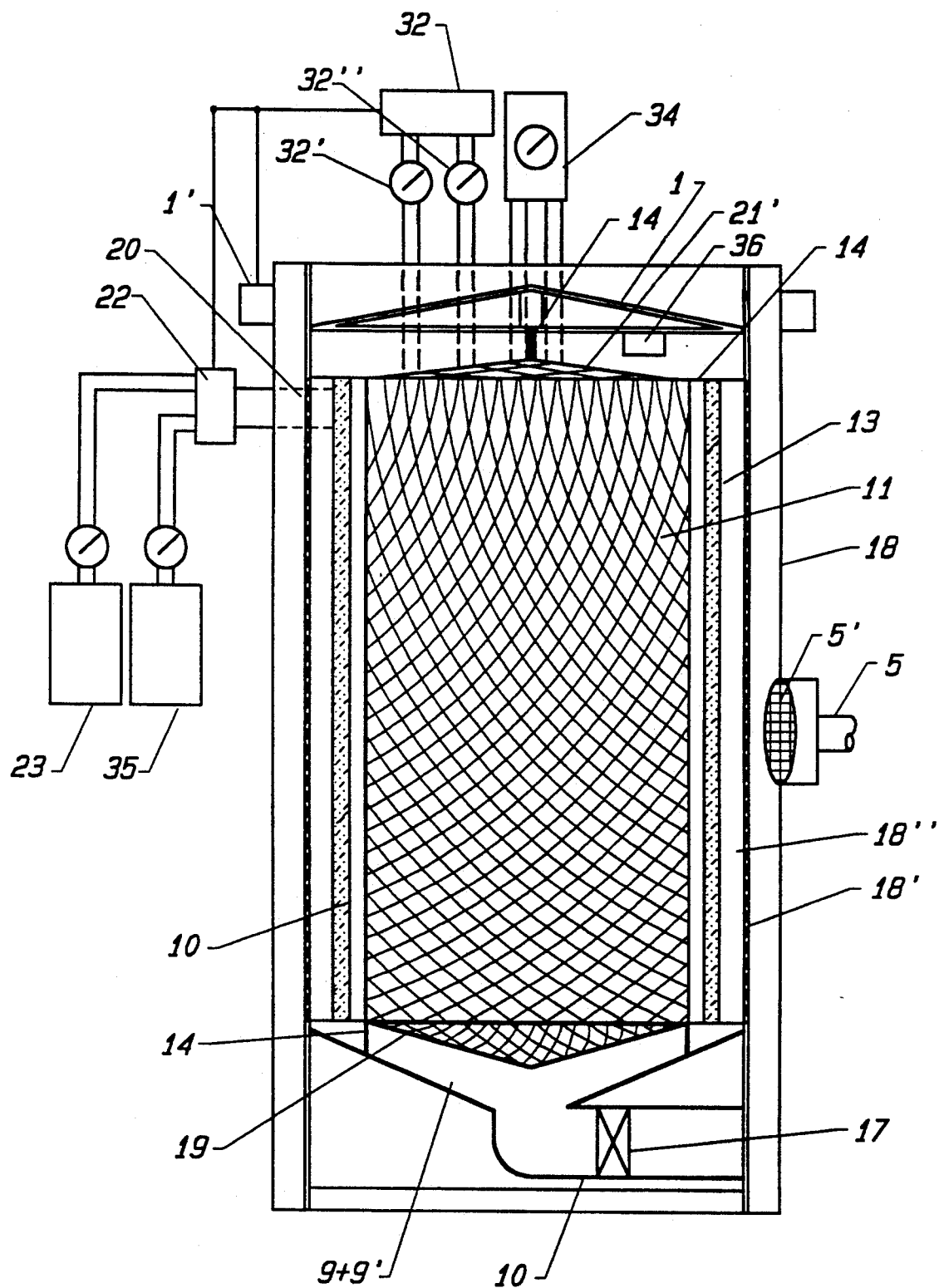
FIG. 4 is a cross-sectional view of one chamber or silo showing its control systems.

FIG. 3 depicts expected temperature verse time curves of the refuse (indicated by the solid line) and the chamber 22 (indicated by the dotted line). The burn cycle of the present invention is summarized as follows. The combustion surface is ignited so that the radiant heat is instantaneously transferred to the refuse. In the first moments of the refuse being subjected to the intense radiant heat emanating from the porous membrane, the moisture embodied in the refuse is driven off as steam. The steam rises to the top of the interior of the apparatus where it is condensed and channeled to the bottom of the incinerator (not shown). The dried refuse is burned to ashes as a consequence of the intense heat radiating from the porous membrane 13. As shown in FIG. 3, the burn cycle is completed with minutes.

As further shown in FIG. 3, the ambient temperature within housing 18 is considerably below the refuse burn temperature due to the directness of radiant heat, the condensing steam and water collected in the base of the unit. The cool down period may take more than an hour to return the system back to room temperature.

The near spontaneous combustion of the refuse in chamber 11 eliminates the need to stir or agitate the refuse to sustain its burning. As the garbage is burned, its ashes fall by the force of gravity to the incinerator floor. Also, means for providing sonic vibrations such as vibrator 36 is provided to force ashes off the core of unburned refuse to expose it directly to the surface combustion at the porous membrane's 13 interior surface. Therefore, the core of the refuse is continually exposed to the radiant heat at the surface of the porous membrane 13, thereby accelerating the complete burning of the column of refuse.

The bottom 21 of the chamber 11 is replaceable in the event that it becomes clogged by molten glass, plastics and metals which resolidify during the cool-down phase. The matter which does pass through bottom 21 of chamber 11 travels through collection space 9, the ash space 10, and ultimately exits the apparatus through cleanout 17. The residual refuse that fall through the chamber 11 is collected in space 9 and burned on a high temperature glass shield 41 which protects combustion surface 13 but is transparent to the radiation heat from combustion surface 42 below. The burned refuse then falls through to ash space 9'.

While the disclosure herein has been directed toward describing an incinerating apparatus for use in a municipal environment, the present invention is equally applicable to industrial and household environments (with possibly some sealing-down modifications). The dimensions of the apparatus for use in an industrial environment may be enlarged, however, the same principles as described herein are applicable to commercial incinerators as well.

Clearly, the general object of the present invention to provide an improved municipal household or industrial incinerator apparatus has been met. Also, the object of the present invention to provide refuse burning apparatus and method for burning which burns refuse without releasing air polluting contaminants into the ambient environment has been met. The household model may also be portable.

Moreover, the object to provide an incineration apparatus safe for municipal use has been met as has the object to provide an incinerator with a short, closed cycle process. Furthermore, the object of the present invention to an incinerator which is self cleaning has also been met. Finally, the object to provide an incinerator which is compact, and has no emission stack has also been met.

While the present invention has been shown and described in what is presently conceived to be the most practical and preferred embodiment of the invention, it will become apparent to those of ordinary skill in the art that many modifications thereof may be made within the scope of the invention, which scope is to be accorded the broadest interpretation of the claims so as to encompass all equivalent structures.

In the claims:

1. A tri-generation garbage incinerator, comprising:
   an incinerator apparatus for burning refuse wherein said incinerator apparatus uses oxygen and a fuel to support the burning of refuse and wherein the burning of refuse in said incinerator apparatus generates heat;
   fuel means for supplying fuel to said incarcerator apparatus wherein said fuel includes oxygen;
   steam generation means in communication with said incinerator apparatus and including a liquid supply for generating steam from using heat generated in said incinerator apparatus by the burning of refuse;
   power means for generating electricity, such using the steam generated by said steam generation means;
   liquid oxygen generation means, powered by the electricity generated by said power means, for generating liquid oxygen; and
   transferring means for transferring liquid oxygen generated by said liquid oxygen generation means to said fuel means for use in said incinerator apparatus.

2. An apparatus as recited in claim 1 wherein said liquid oxygen generation means is a cryogenic plant.

3. An apparatus as recited in claim 2, wherein said cryogenic plant further generates liquid nitrogen.

4. An apparatus as recited in claim 1 wherein said incinerator apparatus for burning refuse, comprises;
   a chamber for containing refuse;
   a porous membrane at least partially enclosing said chamber;
   a housing enclosing said porous membrane and said chamber;
   fuel means for supplying fuel to said porous membrane wherein said fuel includes oxygen; and
   surface combustion means at the surface of said porous membrane facing said chamber for burning refuse contained in said chamber by surface combustion.

5. An apparatus as recited in claim 1 wherein said steam generation means is a boiler-type steam generator.

6. A self-contained garbage incinerating system, comprising:
   a chamber for containing refuse;
   a porous membrane at least partially enclosing said chamber;
   a housing enclosing said porous membrane and said chamber;
   fuel means for supplying fuel to said porous membrane;
   surface combustion means at the surface of said porous membrane facing said chamber for burning refuse contained in said chamber by surface combustion;
   steam generation means including a fluid source and in communication with said surface combustion means for generating steam; and
   electricity-generating means which receives steam generated by said steam generation means, for generating electricity therefrom.

7. A self-contained garbage incinerator as recited in claim 6, further comprising:
   liquid oxygen generation means, powered by the electricity generated by said electricity-generating means, for generating liquid oxygen; and
   transferring means for transferring liquid oxygen generated by said liquid oxygen generation means to said fuel means for supplying fuel to said porous membrane.

8. A garbage incinerating system, comprising:
   (a) a surface combustion garbage incinerating apparatus, including;
   a chamber for containing refuse;
   a porous membrane at least partially enclosing said chamber;
   a housing enclosing said porous membrane and said chamber;
   fuel means for supplying fuel to said porous membrane;
   surface combustion means at the surface of said porous membrane facing said chamber for burning refuse contained in said chamber by surface combustion; and
   (b) a cryogenic apparatus in communication with said surface combustion garbage incinerating system wherein said cryogenic apparatus generates liquid oxygen; and
   (c) transferring means for transferring liquid oxygen generated by said cryogenic plant to said fuel means for use in said self-contained incinerator apparatus.

9. A surface combustion garbage incinerating apparatus as recited in claim 8 further comprising:
   (d) steam generation means in communication with said surface combustion garbage incinerating apparatus and including a liquid supply for generating steam from using heat generated in said incinerating apparatus by the burning of refuse;
   (e) power means for generating electricity, such using the steam generated by said steam generation means.

10. A surface combustion garbage incinerating apparatus as recited in claim 9 wherein said cryogenic apparatus is powered by the electricity generated by said power means.

11. A tri-generation garbage incineration method, comprising the steps of:
   burning refuse in an incinerator apparatus which uses oxygen and a fuel to support the burning of refuse and wherein the burning of refuse in said incinerator apparatus generates heat;
   supplying fuel to said incinerator apparatus wherein said fuel includes oxygen;
   generating steam in a steam generating apparatus which is in communication with said incinerator apparatus and which includes a liquid supply for generating steam by using heat generated in said incinerator apparatus by the burning of refuse;
   generating electricity by using the steam generated by said steam generation means;
   generating liquid oxygen in an cryogenic apparatus powered by the electricity generated in said generating electricity step; and
   transferring liquid oxygen generated by said liquid oxygen generating step for use in said incinerator apparatus.

* * * * *